United States Patent Office 3,111,525
Patented Nov. 19, 1963

3,111,525
CERTAIN PHOSPHORUS ESTER DERIVATIVES
OF 3-AMINOTRIAZOLE
Jacques Meltzer, Kobus Wellinga, and Bernardus Gerhardus van den Bos, all of Van Houtenlaan, Weesp, Netherlands, assignors to North American Philips Company, Inc., New York, N.Y., a corporation of Delaware
No Drawing. Filed Feb. 29, 1960, Ser. No. 11,452
Claims priority, application Netherlands Mar. 3, 1959
7 Claims. (Cl. 260—308)

This invention relates to new and novel phosphorus containing heterocyclic compounds, to methods of preparing these compounds and to the use of said compounds as pesticides.

One of the most important needs in agriculaure is for pesticides which are effective against crop destroying pests such as insects, mites, and fungi and which are at the same time relatively nontoxic to warm blooded animals. The need for such pesticides is constantly increasing in view of the rapidly increasing demand for agricultural products.

It is a principal object then of this invention to produce new and novel phosphorus containing heterocyclic compounds.

It is another principal object of this invention to provide new chemical compounds which are useful for the destruction of plant harmful pests and which are relatively harmless to warm blooded animals.

According to the invention new and novel phosphorus containing heterocyclic compounds are provided. These compounds correspond to the general formula:

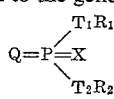

wherein Q represents an organic radical containing a heterocyclic ring consisting of carbon atoms and from 1 to 3 nitrogen atoms, two of said nitrogen atoms being separated from each other by at least one of the ring carbon atoms, and joined to the phosphorus atom through a ring nitrogen, X represents a member of the group consisting of sulfur and oxygen, $T_1$ represents a member of the group consisting of oxygen and sulfur, $T_2$ represents a member of the group consisting of oxygen, sulfur, the radical NH and the radical $NR_3$ wherein $R_3$ represents an alkyl radical containing from 1 to 5 carbon atoms and $R_1$ and $R_2$ each represents aliphatic hydrocarbon radicals. The heterocyclic nucleus may be substituted or condensed with a substituted or unsubstituted benzene nucleus. However, the heterocyclic ring should have aromatic properties.

Examples of heterocyclic radicals that may be represented by Q are the radicals of pyrrole, pyrazole, imidazole, 1,2,4-triazole, indole, carbazole, benzimidazole and substituted products thereof.

These heterocyclic radicals may be substituted with alkyl, alkenyl, cycloalkyl, cycloalkenyl, aryl, aralkyl, aralkenyl, alkylamino, dialkylamino, arylamino, diarylamino, acylamino, alkoxy, and alkylmercapto substituents containing from 1 to 18 carbon atoms, halogen atoms preferably chlorine atoms, the nitro, amino, ureido, carboxy, carbalkoxy and sulfone radicals. Best results are achieved when there are five carbon atoms in the heterocyclic ring and the ring is substituted with one or more alkyl radicals containing from 1 to 7 carbon atoms, a phenyl group and in particular an amino group.

Compounds of the invention in which Q represents the radicals, 3-amino-1,2,4-triazolyl; 3-amino-5-alkyl-1,2,4-triazolyl in which the alkyl group contains from 1 to 7 carbon atoms and 3-amino-5-phenyl-1,2,4-triazolyl and in which $R_1$ and $R_2$ are alkyl groups containing from 2–5 carbon atoms in particular ethyl and isopropyl have been found to be the most effective pesticides.

These compounds are very useful in combating plant harmful pests such as insects and mites especially spider mites and also moulds. In addition a number of these compounds are useful as plant growth regulators.

In particular, it has been found that the O,O-diethyl phosphoryl and the O,O-diethyl-thionophosphoryl derivatives of 3-amino-1,2,4-triazole, 5-phenyl-1,2,4-triazole and 3-amino-5-alkyl-1,2,4-triazole in which the alkyl group contains from 1 to 7 carbon atoms are effective pesticides.

The compounds of the invention may be prepared in such a manner that the phosphoryl thiophosphoryl group is introduced into the cyclic nitrogen containing heterocyclic compound in one or two reaction stages.

Thus according to one method of the invention the heterocyclic compound QH wherein H is the hydrogen atom attached to a ring nitrogen or the compound QMe wherein Me is a metal atom preferably sodium or potassium attached to a ring nitrogen and wherein Q has the indicated meaning is reacted with a compound corresponding to the general formula

wherein Hal represents a halogen atom such as iodine or fluorine but preferably chlorine, X represents oxygen or sulfur, $T_1$ represents oxygen or sulfur, $T_2$ represents oxygen sulfur, the radical =NH or the radical $=NR_3$, wherein $R_3$ represents an alkyl radical containing from 1 to 5 carbon atoms, and $n$ represents 0 or 1. This reaction is preferably carried out in the presence of a hydrogen halide binding agent particularly if the reactant QH is employed. If $n$ has the value 0 in the product

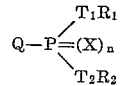

this material is oxidized or sulfurized.

In another method the compound

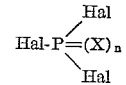

wherein Hal, X and $n$ have their previously designated meanings is reacted with the compound QH or QMe and the resultant product which has the formula

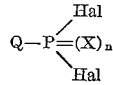

is then reacted with an alcoholate or a thiolate preferably a sodium alcoholate or a sodium thiolate. The heterocyclic compound produced may be oxidized or reacted with sulfur if $n=0$ depending upon whether X represents oxygen or sulfur in the final product.

In still another method of preparing the compounds of the invention, the compound QH or Me is reacted with a compound corresponding to the general formula:

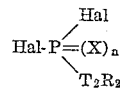

to yield a compound corresponding to the general formula

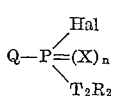

and this halogen containing heterocyclic compound is then reacted with a member of the group consisting of alcoholates and thiolates to produce a compound corresponding to the general formula

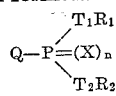

Here too when *n* represents 0 the product is oxidized or sulfurized.

The reactions in which metal compounds of the cyclic nitrogen containing heterocyclic compound are not used, can advantageously be carried out in the presence of a hydrogen halide binding agent. As such there may be used amines and particularly tertiary amines, for example trialkylamines, e.g. trimethyl- and triethylamine and N,N-dialkylanilines and further pyridine and particularly homologues thereof, the picolines, lutidines and collidine and mixtures of these substances.

Another group of acid-binding agents which may be employed comprises metal compounds of sodium, potassium, magnesium, calcium, barium and zinc, such as oxides, hydroxides, carbonates, bicarbonates, alcoholates and carboxylic salts.

These processes of preparing the compounds of the invention are preferably carried out in the presence of a solvent for the cyclic nitrogen containing heterocyclic compound. According to the nature of this compound and its substituents, a nonpolar or polar solvent is chosen. As such solvents there may be used for example aliphatic and aromatic hydrocarbons, for example hexane, petroleum ether and benzene aliphatic ethers, tertiary amines, for example pyridines, nitriles as acetonitrile, ketones as acetone and methylethylketone, esters as ethyl acetate, alcohol, for example methanol and ethanol, and further for example nitrobenzene, carbon tetrachloride, and dimethylformamide.

In cases wherein a metal compound of the cyclic nitrogen containing heterocyclic compound is used as a starting material, polar solvents, for example acetonitrile, are preferred.

In order that the invention may be readily carried into effect it will now be described in greater detail with reference to the examples and tables which follow.

The values calculated for the contents of various elements in the resulting products, given in the examples, relate to a compound formed from 1 mol of the cyclic nitrogen containing heterocyclic compound and 1 mol of the phosphorus containing non-heterocyclic reactant.

Table I summarizes the data of the examples.

Table II gives the names of the final products obtained in the examples.

EXAMPLE I 6.05 g. of collidine and 8.8 g. of diethylphosphorylchloride were successively added to a suspension of 8 g. of 3-amino-5-phenyltriazole-1,2,4 in 100 ml. of acetonitrile. Subsequently the resulting mixture was stirred at 35–40° C. for two hours and then concentrated by evaporation in vacuo. The residue was extracted with acetone, the acetonic solution concentrated by evaporation and the residue, an oil, was washed with petroleum ether (boiling range 40–60° C.). Yield: 60%.

The Examples II–XI and XVI, given in Table I, have been carried out in a manner analogous to that of Example I. Included in Table I are also the Examples XIII–XV which have been carried out in a manner analogous to that of Example XII given below. In Example XV the potassium compound has been used as starting material.

In Table I are successively stated the numbers of the examples, the starting materials, the diluting agents, the reaction temperature, the yields of resulting products, calculated on the quantities of cyclic nitrogen containing heterocyclic compound used, the physical constants of the resulting products. Of the physical constants a boiling-point or a melting point is given. The boiling point is indicated by F, followed by the temperature in ° C. and the relative pressure in mm. of mercury. The melting point, expressed in ° C., is indicated by S.

In the Examples I, II, IV, V, VIII, XIV and XVI O,O-diethylphosphorylchloride is used, in the Examples III, VI, VII, IX, XII, XIV and XV, O,O-diethylthiophosphorylchloride, and in the Examples X and XI, O,O-di-isopropylphosphorylchloride.

In the Examples I–XI collidine was used as the hydrogen acid binding agent.

EXAMPLE XII 11.7 g. of the sodium compound of indole, obtained by the action of sodium on indole, were suspended in 60 cc. of acetonitrile. While stirring the resulting suspension, a solution of 18.9 g. of O,O-diethylthionophosphorylchloride in 20 cc. of acetonitrile was added at about 10–15° C. At the end of the reaction the separated sodium chloride was filtered off, the filtrate evaporated and the residue dissolved in diethyl ether. The ethereal solution was washed with water, dried on sodium sulphate and, after filtration, concentrated by evaporation. The resulting oil was distilled. Boiling point 112–114° C. at 0.005 mm. of mercury pressure. Yield: 66%.

In the Examples XVII–XXI an O-alkyl-N-dimethylamidophosphoryl chloride is used as the phosphoriferous reaction component. The Examples XVIII–XXI have been carried out in a manner analogous to that of Example XVII.

EXAMPLE XVII

A mixture of 8.4 g. of 3-aminotriazole-1,2,4, 12.1 g. of collidine, 70 cc. of acetonitrile and 17.2 g. of O-ethyl-

*Table I*

| Number Example | Starting material | Diluting Agent | React. temp. in ° C. | Yield in percent | Physical constants |
|---|---|---|---|---|---|
| I | 3-amino-5-phenyltriazole-1.2.4 | acetonitrile | 35–40 | 60 | (oil.) |
| II | 3-aminotriazole-1.2.4 | acetone | −20 to −30 | 68 | (oil.) |
| III | ----do---- | ----do---- | about 15 | 10 | S=82–85° C. |
| IV | 3-amino-5-pentyltriazole-1.2.4 | dimethylformamide+acetone | ----do---- | 40 | (oil.) |
| V | 3-amino-5-methyltriazole-1.2.4 | ----do---- | ----do---- | ?? | (oil.) |
| VI | 3-amino-5-pentyltriazole-1.2.4 | ----do---- | ----do---- | 100 | (oil.) |
| VII | 3-amino-5-methyltriazole-1.2.4 | ----do---- | ----do---- | 50 | (oil.) |
| VIII | 3-amino-5-ethyltriazole-1.2.4 | acetonitrile | about 25 | 84 | (oil.) |
| IX | ----do---- | ----do---- | about 15 | 73 | (oil.) |
| X | 3-amino-5-pentyltriazole-1.2.4 | diethyl ether | about 35 | 55 | S=53–54° C. |
| XI | 3-aminotriazole-1.2.4 | acetonitrile | about 45 | 100 | (oil.) |
| XII | Indole | ----do---- | about 15 | 66 | F=112–114° C. at 0.005 mm. |
| XIII | ----do---- | ----do---- | ----do---- | 51 | F=110–112° C. 0.01 mm. |
| XIV | 3-amino-5-phenyltriazole-1.2.4 | ----do---- | 70–80 | 51 | S=63–65° C. |
| XV | carbazole | ----do---- | 60–70 | 63 | (oil.) |
| XVI | 2-aminobenzimidazole | acetone | about 50 | 30 | S=228–229° C. |
| XVII | 3-aminotriazole-1.2.4 | acetonitrile | about 20 | 82 | S=57–64° C. |
| XVIII | 3-amino-5-pentyltriazole-1.2.4 | diethyl ether | 35 | 76 | (oil.) |
| XIX | 3-aminotriazole-1.2.4 | acetonitrile | 60–70 | 64 | S=108–110° C. |
| XX | 3-amino-5-pentyltriazole-1.2.4 | benzene | 60–70 | 66 | (oil.) |
| XXI | 5-phenyl-3-aminotriazole-1.2.4 | acetonitrile | 60–70 | 75 | S=104–105° C. |

N-dimethylamido-phosphorylchloride was stirred at about 20° C. for 90 minutes. Then the solvent was distilled off and the resulting residue was extracted with benzene. The benzene solution was concentrated by evaporation and the obtained residue was washed with petroleum-ether (boiling range 40–60° C.). Yield: 18 g. (Y.= 82%). Melting point: 57–64° C.

*Table II*

| Example No. | Product |
|---|---|
| I | N-(O.O-diethylphosphoryl)-3-amino-5-phenyltriazole-1.2.4. |
| II | N-(O.O-diethylphosphoryl)-3-aminotriazole-1.2.4. |
| III | N-(O.O-diethylthionophosphoryl)-3-aminotriazole-1.2.4. |
| IV | N-(O.O-diethylphosphoryl)-3-amino-5-pentyltriazole-1.2.4. |
| V | N-(O.O-diethylphosphoryl)-3-amino-5-methyltriazole-1.2.4. |
| VI | N-(O.O-diethylthionophosphoryl)-3-amino-5-pentyltriazole-1.2.4. |
| VII | N-(O.O-diethylthionophosphoryl)-3-amino-5-methyltriazde-1.2.4. |
| VIII | N-(O.O-diethylphosphoryl)-3-amino-5-ethyltriazole-1.2.4. |
| IX | N-(O.O-diethylthionophosphoryl)-3-amino-5-ethyltriazole-1.2.4. |
| X | N-(O.O-di-isopropylphosphoryl)-3-amino-5-pentyltriazole-1.2.4. |
| XI | N-(O.O-di-isopropylphosphoryl)-3-aminotriazole-1.2.4. |
| XII | N-(O.O-diethylthionophosphoryl)indole. |
| XIII | N-(O.O-diethylphosphoryl)indole. |
| XIV | N-(O.O-diethylthionophosphoryl)-3-amino-5-phenyltriazole-1.2.4. |
| XV | N-(O.O-diethylthionophosphoryl) carbazole. |
| XVI | N-(O.O-diethylphosphoryl)-2-aminobenzimidazole. |
| XVII | N-(O-ethyl-N-dimethylamidophosphoryl)-3-aminotriazole-1.2.4. |
| XVIII | N-(O-ethyl-N-dimethylamidophosphoryl)-3-amino-5-pentyltriazole-1.2.4. |
| XIX | N-(O-isopropyl-N-dimethylamidophosphoryl)-3-aminotriazole-1.2.4. |
| XX | N-(O-isopropyl-N-dimethylamidophosphoryl)-3-amino-5-pentyltriazole-1.2.4. |
| XXI | N-(O-isopropyl-N-dimethylamidophosphoryl)-3-amino-5-phenyltriazole-1.2.4. |

The active compounds of the invention may be formulated and employed in the conventional manner for destroying the noxious organisms. Thus they may be mixed with solid carriers, ground to the desired particle size and dusted on the crops. Examples of the solid carriers that may be employed are pipe clay, diatomaceous earth, kaolin, dolomite, talcum, gypsum, bentonite, attapulgite, kieselghur, celite, wood meal, tobacco dust, ground walnut shells and ground cocoanut shells. In these dusts the concentration of the active compound usually lies between about 1–22% by weight.

The active compounds of the invention may also be applied to the crops in the form of suspensions in a volatile liquid usually water. In preparing such a suspension the active compound is formed into a wettable powder and then dispersed in a volatile solvent such as water. In the formulation of the wettable powder the active compound is ground with a solid carrier of the type employed in forming a dust and a suitable dispersion agent such as a lignin sulfonate or a naphthalene sulfonate and/or a suitable wetting agent such as a fatty acid sulfonate, an alkaryl sulfonate or an acid condensation product of the type sold under the trademark "Igepon" are added. In the wettable powder the concentration of the active compound may vary between wide limits. However, a concentration of between about 10 to 80% by weight is usually preferred.

Finally the active compounds of the invention may be applied to the crops in the form of emulsions in water or other volatile liquids. In preparing these emulsions the active compound is first formed into a miscible oil. These miscible oils contain besides the active compound a water insoluble solvent for the active compound and an emulsifier. Among solvents that may be employed are xylene, toluene, dioxane, aromatic petroleum distillates such as solvent naphtha, distilled tar oil, tetralene and cyclohexane and mixtures of these liquids. Among the emulsifiers that may be employed are the alkyl phenoxyglycol ethers, polyoxyethylene sorbitan esters of fatty acids, polyoxyethylene-sorbitol esters of fatty acids and the emulsifiers known by the trademarks "Tween," "Triton" and "Atlox." The concentration of the active-compound in the solvent is usually about 2–50% by weight and in the emulsion the concentration of the active compound is usually between about 0.01 to 0.5% by weight.

While we have described our invention in connection with specific embodiments and applications, other modifications thereof will be readily apparent to those skilled in this art without departing from the spirit and scope of the invention as defined in the appended claims.

What is claimed is:

1. A triazolyl phosphorus compound of the formula

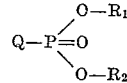

wherein Q is 3-amino-1,2,4-triazolyl substituted in the 5 position only with up to one alkyl of 1 to 7 carbon atoms, the phosphorus is directly attached to a ring nitrogen and $R_1$ and $R_2$ are each alkyl of 2–5 carbon atoms.

2. A triazolyl phosphorus compound of the formula

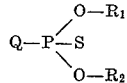

wherein Q is 3-amino-1,2,4-triazolyl substituted in the 5 position only with up to one alkyl of 1 to 7 carbon atoms, the phosphorus is directly attached to a ring nitrogen and $R_1$ and $R_2$ are each alkyl of 2–5 carbon atoms.

3. A 3-amino-5-phenyl-1,2,4-triazolyl phosphorus compound of the formula.

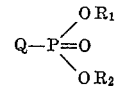

wherein Q is 3-amino-5-phenyl-1,2,4-triazolyl, $R_1$ and $R_2$ are each alkyl of 2 to 5 carbon atoms and the phosphorus is directly attached to a ring nitrogen.

4. A 3-amino-5-phenyl-1,2,4-triazolyl phosphorus compound of the formula.

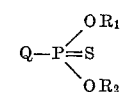

wherein Q is 3-amino-5-phenyl-1,2,4,-triazolyl, $R_1$ and $R_2$ are each alkyl of 2 to 5 carbon atoms and the phosphorus is directly attached to a ring nitrogen.

5. N - (O,O - diisopropylphosphoryl) - 3 - aminotriazole-1,2,4 wherein the phosphorus is directly attached to a ring nitrogen of the triazole ring.

6. A N-(O,O-diethylphosphoryl)-3-amino-5-alkyl-1,2,4 triazole wherein said alkyl is of 1–7 carbon atoms and wherein the phosphorus is directly attached to a ring nitrogen.

7. A N-(O,O-diethylthiophosphoryl)-3-amino-5-alkyl-1,2,4 triazole wherein said alkyl is of 1–7 carbon atoms and wherein the phosphorus is directly attached to a ring nitrogen.

References Cited in the file of this patent

UNITED STATES PATENTS

| 2,710,296 | Jones et al. | June 7, 1955 |
| 2,751,384 | Coover et al. | June 19, 1956 |

(Other references on following page)

UNITED STATES PATENTS

| | | |
|---|---|---|
| 2,844,582 | Raley | July 22, 1958 |
| 2,888,379 | Bruning | May 26, 1959 |
| 2,953,491 | Hardy et al. | Sept. 20, 1960 |

FOREIGN PATENTS

| | | |
|---|---|---|
| 713,278 | Great Britain | Aug. 11, 1954 |

OTHER REFERENCES

Frear et al.: J. of Economic Entomology, vol. 40, pp. 736–741 (1947).

Atkinson et al.: Chem. Abstracts, vol. 52, col. 11538 (1958).

Chemical Abstracts, index to vol. 53, p. 2114S (1959).

Coe et al.: Chem. Abstracts, vol. 53, col. 19285 (1959).